US005626658A

United States Patent [19]
McArdle

[11] Patent Number: 5,626,658
[45] Date of Patent: May 6, 1997

[54] METHOD OF ENHANCING INTERNAL ADHESION OF CEMENTITIOUS COMPOSITIONS AND COMPOSITIONS THEREFOR

[76] Inventor: Blaise McArdle, 17 Leonard St., Annisquam, Mass. 01930-1321

[21] Appl. No.: 610,658

[22] Filed: Mar. 4, 1996

Related U.S. Application Data

[63] Continuation-in-part of Ser. No. 523,163, Sep. 5, 1995, Pat. No. 5,514,412.

[51] Int. Cl.⁶ .................. C04B 24/14; C09D 7/12; C09D 105/00; C09D 195/00
[52] U.S. Cl. .................. 106/144.1; 106/144.2; 106/144.3; 106/144.6; 106/144.71; 106/648; 106/656; 405/15; 405/264; 427/136
[58] Field of Search .................. 106/144.1, 144.2, 106/144.3, 144.6, 144.71, 648, 656, 900; 427/136; 405/15, 264

[56] References Cited

U.S. PATENT DOCUMENTS

| | | | |
|---|---|---|---|
| 1,904,341 | 4/1933 | Young | 106/144.1 |
| 1,974,915 | 9/1934 | Giesecke | 106/144.1 |
| 3,227,569 | 1/1966 | Thompson | 106/900 |
| 3,346,407 | 10/1967 | Van Leuven | 106/900 |
| 3,696,621 | 10/1972 | Simms et al. . | |
| 3,763,072 | 10/1973 | Krieger . | |
| 3,876,576 | 4/1975 | Michalski . | |
| 3,900,611 | 8/1975 | Corbett et al. . | |
| 5,395,646 | 3/1995 | Basseres et al. | 427/136 |
| 5,514,412 | 5/1996 | McArdle | 427/136 |

*Primary Examiner*—David Brunsman

[57] ABSTRACT

This invention relates to a process for treating cementitious containing materials including asphalt with a binding composition containing a protein-polysaccharide complex to improve resistance to erosion caused by environmental forces and physical wear and to enhance internal adhesion of the compositions. The use of the binding compositions in asphalt paving compositions reduces the amount of bitumen or asphalt emulsion necessary to produce asphalt paving compositions while increasing the wear resistance of the asphalt paving composition.

48 Claims, No Drawings

METHOD OF ENHANCING INTERNAL ADHESION OF CEMENTITIOUS COMPOSITIONS AND COMPOSITIONS THEREFOR

RELATED APPLICATION

This is a continuation-in-part application of Ser. No. 08/523,163, filed Sep. 5, 1995, now U.S. Pat. No. 5,514,412.

FIELD OF THE INVENTION

This invention relates to a process for treating cementitious containing materials including asphalt with a binding composition containing a protein-polysaccharide complex to improve resistance to erosion caused by environmental forces and physical wear and to enhance internal adhesion of the compositions. The use of the binding compositions in asphalt paving compositions reduces the amount of bitumen or asphalt emulsion necessary to produce asphalt paving compositions while increasing the wear resistance of the asphalt paving composition.

BACKGROUND OF THE INVENTION

Asphalt materials are utilized in many applications including road coating and paving formations, roofing compositions, roofing materials (shingles, felt, etc.), waterproofing coatings and compositions and in many other diverse applications. Other cementitious materials such as compositions containing hydraulic, rubber, Portland and organic cement or concrete are utilized in road paving formations, building structures, building and structural component formation, roofing compositions, waterproofing coatings, bonding compositions and in many other diverse applications.

Erosion of cementitious structures such as paved road surfaces or other structures is caused by environmental conditions such as wind, rain, water flow, freeze-thaw cycle temperature change and physical wear from traffic. Typically the effects of such erosion is manifested by cracks and potholes in asphalt and cement pavement; or by cracks in asphalt shingles, cement and concrete structures.

Several methods have been suggested in the prior art to stabilize cementitious compositions including asphalt compositions, however, none of these methods significantly enhance the cementitious structures against the powerful forces of erosion.

Asphalt paving compositions are produced by a combination of aggregate formed from crushed rock or stones and other filler materials and asphalt wrap applied in the form of a bituminous coating or an asphalt emulsion. Asphalt and other bituminous materials are obtained as the bottoms products during petroleum refining. Due to the fluctuation in the price and availability of oil for refining, it would be extremely desirable to develop an additive to asphalt containing materials such as asphalt pavement that reduces the amount of bitumen necessary to produce high quality asphalt products including paving compositions.

It is an object of the present invention to provide a binding or stabilizing composition for addition into cementitious containing materials including asphalt to improve resistance to erosion caused by environmental forces and physical wear and to enhance internal adhesion of the compositions.

It is another object of the present invention to provide method to impregnate bitumen, asphalt and other cementitious compositions with a binding or stabilizing composition to improve the resistance of the subsequently formed surface coatings against erosion.

It is still another object of the present invention to provide method to impregnate bitumen, asphalt and other cementitious compositions with a binding or stabilizing composition to enhance internal adhesion of the compositions.

It is yet another object of the present invention to provide method to impregnate asphalt compositions with a binding or stabilizing composition to enhance internal adhesion of the compositions while reducing the amount of bitumen required to produce high quality asphalt products including paving compositions.

Other objects and many of the attendant advantages of this invention will be readily appreciated upon review of the following detailed description.

SUMMARY OF THE INVENTION

The present invention is directed to a process for treating cementitious materials including asphalt or bituminous materials with a binding composition containing a protein-polysaccharide complex to enhance internal adhesion of the compositions and to increase the wear resistance of these cementitious composition. These binding compositions are used as an additive into asphalt paving compositions to reduce the amount of bitumen or asphalt emulsion necessary to produce high quality asphalt paving compositions. The protein-polysaccharide complex can be mixed into the cementitious materials as a dry granular mixture or in solution and can be mixed with a variety of adjuvants.

DETAILED DESCRIPTION OF THE INVENTION

It has been found that cementitious products such as road surfaces formed from asphalt or cement can be stabilized against erosion by water, snow and wind by incorporating a binding composition containing a protein-polysaccharide complex into the base asphalt or cement composition. The method of the present invention is applicable to the treatment of either asphalt or concrete with the protein-polysaccharide complex to aid in the prevention or reduction of erosion of such surfaces by curtailing cracking and the formation of potholes in such paved road surfaces. The protein-polysaccharide complex can be admixed with either the asphalt and concrete during preparation of the asphalt and cement compositions.

The protein-polysaccharide complex (PPC) composition used as a binding or stabilizing compound in the present invention includes a water-soluble polysaccharide and a substantially water-insoluble protein. The protein-polysaccharide complex composition can be formed in granular form or as a solution.

Examples of polysaccharides that can be used to prepare the PPC composition include, but are not limited to water-soluble cellulose derivatives, seaweed polysaccharides such as alginate and carrageenin, seed mucilaginous polysaccharides, complex plant exudate polysaccharides such as gum Arabic, tragacanth, gmar gum, pectin, ghatti and the like, and microbially synthesized polysaccharides such as xanthan gum. In a preferred embodiment, the polysaccharides are guar gum, pectin, gum Arabic and mixtures thereof. The most preferred polysaccharide for use in the present binding or stabilization composition is guar gum.

The polysaccharide is present in the PPC composition in an amount ranging between about 90% to 99.5% by weight of the combined polysaccharide and protein components in the PPC composition, preferably in an amount ranging between about 95% to 99% by weight of the combined polysaccharide and protein components of the PPC composition.

Similarly, proteins useful in the binding or stabilizing PPC composition can be any protein that is predominately or substantially water-insoluble, however, vegetable proteins or prolamines are advantageously preferable due to their availability. Prolamine is a cereal-derived protein that is insoluble in water, absolute alcohol or neutral solvents and soluble in dilute (80%) alcohol. Examples of suitable prolamines for use in the present invention include, but are not limited to, corn-derived prolamine or zein, barley-derived prolamine or hordein, and wheat-derived prolamine or gliadin.

In a preferred embodiment of the invention, the vegetable protein or prolamine used in the composition is zein or corn gluten. Zein is extracted from corn or maize. PPC compositions containing zein are used to form odorless, clear, hard and almost invisible films. Sixteen amino acids have been isolated from zein including glutamic acid or glutamine, leucine, proline, alanine, phenylalanine, isoleucine, serine, tyrosine and asparagine. The remaining seven amino acids are present in amounts of less than 3% by weight.

Zein is commonly extracted from corn gluten by physical separation means as opposed to chemical separation means. Whole corn zein contains a heterogeneous mixture of disulfide linked aggregates. Commercial extraction of zein generally results in a product with a molecular weight of about 25,000 to 35,000. Zein contains a high proportion of hydrocarbon group side chains and has a high percentage of amide groups present with a relatively low amount of free carboxylic acid groups.

The substantially water-insoluble protein is present in the PPC composition in an amount ranging between about 0.5% to 10% by weight of the combined polysacchafide and protein components of the PPC composition, preferably in an amount ranging between about 1% to 5% by weight.

Relatively small amounts of a pH adjusting compound in the form of an acid or an acidulant are preferably used to lower the pH of the aqueous polysaccharide solutions during preparation of the PPC compositions to between 1 to 11.5, preferably about 3.8 to 8.5. The acidulants enhance the water dispersibility of the PPC compositions, thereby facilitating reconstitution of the protein-polysaccharide complex compositions in water. Although any pH adjusting acidic compound is useful in the present invention, including inorganic acids such as carbonic acid, sulfuric acid, hydrochloride acid and the like, it is preferable to utilize organic acids, preferably $C_1$ to $C_{20}$ organic acids. Suitable organic acidulants include, but are not limited to, citric acid, malic acid, adipic acid, tannic acid, lactic acid, ascorbic acid, acetic acid, fumaric acid and the like and mixtures thereof. In a preferred embodiment, citric acid is used.

The acids or acidulants are preferably used in an amount between about 0.25% to 5% by weight of the combined weight of polysaccharide and protein components of the PPC compositions, preferably in an amount between about 0.5% to 1% by weight. The acid is preferably added to the water of an aqueous organic solvent system prior to addition of the protein and polysaccharide organic component.

PPC compositions are preferably prepared by dissolving a water-insoluble protein or prolamine in an aqueous organic solvent system containing the pH adjusting acidic component to form a protein solution. A soluble polysaccharide is then added to the protein solution to form a protein-polysaccharide complex in solution. If desired, the solvent is then separated or evaporated from the solution to yield the final protein polysaccharide complex composition.

The aqueous organic solvent system is a mixture containing at least one organic solvent in water. Suitable organic solvents include, but are not limited to, alcohols such as ethyl alcohol and isopropyl alcohol; glycols such as propylene glycol and polyethylene glycols; and, ketones such as acetone. In a preferred embodiment of the invention, the aqueous organic solvent system is either aqueous ethyl alcohol or aqueous isopropyl alcohol. Alcohols generally can hold up to six grams of zein in solution for each 100 milliliters of alcohol.

The desired ratio of water to organic solvent in the aqueous organic solvent system is dependent on factors such as the miscibility of the solvent in the water and the amount of protein to be dissolved. When the organic solvent system is aqueous ethyl alcohol or aqueous isopropyl alcohol, the amount of water generally ranges between about 10% to 40% by weight and the amount of alcohol generally ranges between about 60% to 90% by weight. More preferably, the mount of water in such systems is between about 25% to 35% and the amount of alcohol is between about 65% to 75%.

The substantially water-insoluble protein or prolamine is added to the aqueous organic solvent system in an amount between about 100 and 300 grams of prolamine per liter of aqueous organic solvent system, more preferably in an amount between about 120 to 240 grams per liter. The dissolution is carried out at a temperature between about 20° C. (ambient room temperature) and about 60° C., preferably about 30° C. using conventional agitation methods to form a protein solution. Soluble polysaccharide in minute fiber or particulate form is then admixed with the protein solution to form a PPC in solution.

In an alternative embodiment, a protein containing gluten such as corn gluten can be directly added into the aqueous organic solvent system instead of pure zein. In this preparation procedure, the zein protein portion of the gluten passes into solution while the deprotenated non-zein remainder of the gluten can be separated by vacuum filtering or other standard separation techniques. An incidental amount of up to 100% by weight of expended or deprotenated gluten can be present in the recovered admixture with the protein-polysaccharide complex without adversely affecting the properties of the PPC, however it is preferable to employ amounts up to 10% by weight of the gluten.

The protein-polysaccharide portion of a PPC in solution generally contains between about 90% to 99.5% by weight of polysaccharide, between about 0.5% to 10% of a protein. The PPC solution preferably additionally, contains between about 0.25 to 5% by weight of a pH adjusting component based upon the total weight of protein and polysaccharide. More preferably, the PPC solution contains between about 95% to 99% of polysaccharide and between about 1% to 5% of vegetable protein based on the total weight of polysaccharide and protein.

It is important that the substantially water-insoluble protein or prolamine thoroughly impregnate the soluble polysaccharide particles during the process of admixing the soluble polysaccharide with the protein solution. The aqueous organic solvent system used to prepare the protein solution should wet the soluble polysaccharide particles so that the hydrophilic soluble polysaccharide particles are impregnated or coated with the hydrophobic protein to form the PPC in solution.

The mixing process to prepare PPC in solution is carried out until a complete uniform mixture is attained. In general, the process is carried out at a temperature between about 20° C. and 60° C., preferably between about 20° C. and 25° C. for a time period of between about 10 and about 30 minutes, preferably between about 10 and 15 minutes. The PPC in solution is agitated during the mixing process by conventional agitation methods including, but not limited to, manual shaking, mechanical shaking, magnetic stirring, mechanical stirring or a combination thereof.

Additives that promote impregnation may be added at any point during the admixing process. Suitable additives include, but are not limited to, detergents and emulsifiers. Exemplary additives are polysorbates, oils and albumin. Additives may be used in an amount between about 0.25% to 5.0% by volume of the PPC in solution, preferably between about 0.5% to 1.0%.

Once the PPC in solution has been prepared, the solvent is optionally separated or evaporated to yield a protein-polysaccharide complex composition, that is, a particulate polysaccharide impregnated or complexed with a protein. Any number of solvent removal techniques may be used including, but not limited to, vacuum drying, centrifugation, evaporation, freeze drying, air drying, convection oven drying or a combination thereof. One preferred method of extracting the solvent is vacuum drying which safety removes and recovers the solvent while drying the product to provide the PPC composition. The protein-polysaccharide complex composition provided in accordance with the invention can be further processed by grinding or milling to a desired mesh particle size for use as a powder and the like.

In another embodiment, the PPC in solution can be mixed directly into water for application into cementitious compositions. The PPC solution can be diluted with water for administration into cementitious compositions. Typically an aqueous solution of PPC contains 0.1 to 50 grams of PPC per liter of water. In the production of asphalt paving compositions the PPC solution can be sprayed onto aggregate prior to mixing the aggregate with an asphalt emulsion.

Alternatively, the particulate or powdered protein-polysaccharide complex can be admixed directly into cementitious compositions. The cementitious compositions of the present invention including cement, asphalt or bitumen containing compositions include an effective mount of the protein-polysaccharide complex composition to enhance the internal adhesion of the cementitious compositions in an amount ranging from about 0.0001 to 3.0 weight percent of the total cement, asphalt or bitumen in each cementitious composition, preferably in an amount ranging from about 0.0002 to 1.5 weight percent of the total cement, asphalt or bitumen in each cementitious composition.

In the method according to the present invention the asphalt, bitumen or cement composition is admixed at any time during the maintenance of their liquid or emulsified states with a powdered or granular PPC composition or an aqueous solution of a PPC composition. The dispersibility and the internal adhesion enhancing characteristics of the PPC composition can be modified by adding up to 5%, preferably 0.125% to 5%, by weight of particulate metal oxides or sulfides containing metals from Periodic Table Groups 4 to 13, preferably Groups 8 to 10, most preferably any valent form of iron oxide and iron sulfide. These metal oxides or sulfides can be added to the initial solvent system to admix with the PPC composition during formation or be subsequently added to and mixed with the dry powdered PPC composition. The solution or powder incorporated into the cementitious compositions may additionally contain one or more additives at a total level of up to 20% by weight of the combined polysaccharide and protein components of the PPC composition including urea, tall oil, fillers, pigments, stabilizers, thickening agents, buffers and mineral salts. Particularly useful fillers include urea, tall oil, waxes, paraffins, resin, lignin stabilizers, $SiO_2$, drilling muds and borax (sodium borate). Borax is preferably added only to a dry mixture of a PPC composition.

The dispersibility and the internal adhesion enhancing characteristics of the PPC composition are most preferably modified by adding urea and/or tall oil each in an amount ranging up to 10% by weight of the combined polysaccharide and protein components of the PPC composition.

In a preferred embodiment of the present invention, rock fines or dust is added to the cementitious composition in an amount ranging between 1 to 5 percent by weight of the cementitious composition. The addition of the rock fines or dust serves to decrease the porosity of the final cementitious product.

In a preferred embodiment, the PPC composition can be added in granular form or in solution directly to cementitious compositions in amounts of protein-polysaccharide complex (PPC) ranging from 0.0002 to 1%, preferably 0.0001 to 0.1% by weight of the total cementitious composition. The addition of this PPC additive to cementitious composition including cement or asphalt improves tensile strength and internal adhesion properties of the cement or asphalt.

The present process for treating cementitious containing materials including asphalt with a binding composition containing a protein-polysaccharide complex improves resistance of the subsequently formed cementitious composition to erosion caused by environmental forces and physical wear and enhances the internal adhesion of the cementitious composition. The use of the binding compositions in asphalt paving compositions reduces the amount of bitumen or asphalt emulsion necessary to produce asphalt paving compositions while increasing the wear resistance of the asphalt paving composition. The incorporation of a PPC composition into cementitious composition including cement and asphalt increases the elasticity and longevity of the subsequently formed cement or asphalt product or cementitious or asphalt paving coating, thereby reducing the likelihood of the product or coating to crack. Granular PPC composition is preferably added to the dry cement or asphalt during formation.

The use of PPC additives to asphalt compositions during asphalt fabrication processes promotes increased internal adhesion between the asphalt wrap and the virgin aggregate such as comminuted stone, resulting in an asphalt product having improved road surface characteristics. Asphalt paving compositions containing PPC as an additive can reduce the amount of asphalt or bitumen necessary to produce the paving composition since the PPC additive promotes adhesion and coating of the asphalt onto the virgin aggregate. It is believed that the use of an effective amount of the PPC additive to enhance the internal adhesion of asphalt or bitumen in a paving composition can result in up to a 25% by weight reduction of the amount of required asphalt or bitumen content. Preferably asphalt road paving composition incorporating the PPC additive of the present invention may contain 4.3 to 4.7% by weight of asphalt emulsion or lower in the asphalt paving composition in normal asphalt paving compositions containing at least 5.5% by weight of asphalt emulsion.

It is believed that the composition used according to the present invention forms a protective binding layer on the aggregate in the paving composition by hydrogen bonding with silica and silicates present in the aggregate. The binding compositions of the present invention are particular useful in asphalt materials utilized in many applications including road coating and paving formations, roofing compositions, roofing materials (shingles, felt, etc.), waterproofing coatings and compositions and in many other diverse applications. The binding compositions of the present invention are also useful in other cementitious materials such as cementitious compositions containing hydraulic, rubber, Portland and organic cement or concrete utilized in road paving formations, building structures, building and structural component formation, roofing compositions, waterproofing coatings, bonding compositions and in many other diverse applications.

The invention is illustrated by the following examples in which parts and percentages are expressed by weight unless otherwise stated.

EXAMPLE A

A 10% zein solution was prepared by dissolving 10 grams of unstripped zein in 90 grams of an aqueous isopropyl alcohol solution. The aqueous isopropyl alcohol solution contained 15% water by weight and 85% isopropyl alcohol by weight. Dissolution was carried out in a 500 ml beaker and the solution was initially stirred using a mechanical stirrer at a speed of over 100 rpm in order to fully wet the zein. Once all of the zein was dispersed, the stirring speed was reduced by about ½ for an additional five minutes to insure complete dissolution of the zein in the aqueous isopropyl alcohol solution and to produce a protein solution. The ambient temperature was maintained at 22° C. throughout this procedure.

Two hundred grams of milled guar gum powder (fine-60 mesh, TIC GUMS, Belcamp, Md.) was slowly added to the protein solution with vigorous stirring using a mechanical stirrer at a speed of over 100 rpm. Manual stirring was started as the mixture thickened. Additional aqueous isopropyl alcohol was added to attain a soupy appearance indicative of successful impregnation of the soluble guar gum particles by the zein solution. Agitation of this soupy liquid mixture was maintained for fifteen minutes.

The resulting PPC solution was dried under reduced pressure of 0.05 atmospheres, at a temperature of 60° C. using a lab-line Duo-Vac vacuum oven manufactured by LabLine Corp., Melrose Park, Ill. The resulting recovered dried PPC composition was a yellowish-beige color and was milled to a granular form (80 mesh).

EXAMPLE B

The procedure of Example A was followed, however 1.5 grams of iron oxide (FeO) (Harcros high moment iron oxide TB5600 - lot F4122, Easton, Pa.) was mixed per each 10 grams of zein contemporaneously with the addition of the guar gum. The iron oxide/PPC mixture was not recovered from the solution but 4405.3 ml containing approximately 2516.5 grams of PPC was directly mixed into a 250 gallon gravity spray applicator filled with water.

EXAMPLES 1 TO 3

Three asphalt paving compositions were prepared as displayed in Table 1. The composition of Example 1 contained 10 grams of PPC composition prepared in accordance with the procedure of Example A. The asphalt paving composition of Example 2 contained 10 grams of iron oxide/PPC composition prepared in accordance with the procedure of Example B. The asphalt paving composition of Example 3 was a control and contained no PPC composition. All percentages in the table are by weight of the total asphalt paving composition except air voids are represented in volume percentage. The stability was measured by the Marshall Test.

TABLE 1

| Example No. | 1 | 2 | 3 |
| --- | --- | --- | --- |
| Dry weight of Sample | 717 | 768 | 1193 |
| % Asphalt content | 4.15 | 4.7 | 4.29 |
| % Aggregate passing by weight | | | |
| No. 8 sieve | 33.5 | 37.5 | 34.3 |
| No. 200 sieve | 2.8 | 2.7 | 3.4 |
| Air voids, % | 7.7 | 8.1 | 9.4 |
| Stability @ 77° F., (lbs.) | 2458.3 | 2275.7 | 2759.0 |

What is claimed is:

1. A method of enhancing internal adhesion of an asphalt containing composition by admixing with said cementitious composition a protein-polysaccharide complex composition comprising:

between about 90% to 99.5% by weight of a water-soluble polysaccharide impregnated with between about 10% to 0.5% by weight of a substantially water-insoluble protein in an mount effective to enhance the internal adhesion of said asphalt containing composition.

2. The method of claim 1 wherein the water-soluble polysaccharide is selected from the group consisting of alginate, carrageenin, gum arabic, tragacanth, guar gum, pectin, ghatti, xanthan gum and mixtures thereof.

3. The method of claim 1 wherein the substantially water-insoluble protein is a prolamine.

4. The method of claim 1 wherein the substantially water-insoluble protein is zein.

5. The method of claim 1 wherein the protein-polysaccharide complex composition further includes at least one additive for promoting impregnation of the water-soluble polysaccharide by the protein.

6. The method of claim 1 wherein the substantially water-insoluble protein is hordein or gliadin.

7. The method of claim 1 wherein the effective amount of the protein-polysaccharide complex composition to enhance the internal adhesion of said asphalt containing composition is from 0.0001 to 3.0 weight percent of the total asphalt containing composition.

8. The method of claim 1 wherein the water-soluble polysaccharide comprises guar gum and the substantially water-insoluble protein comprises zein.

9. The method of claim 1 wherein the protein-polysaccharide complex composition further comprises between about 0.25% to 5% by weight of an acidulant.

10. The method of claim 9 wherein the acidulant is selected from the group consisting of tannic acid, lactic acid, ascorbic acid, acetic acid, citric acid, malic acid, adipic acid, fumaric acid and mixtures thereof.

11. The method of claim 9 wherein the acidulant is citric acid.

12. The method of claim 1 wherein the protein-polysaccharide composition further comprises 0.125 to 5% by weight of a metal oxide filler calculated on the weight of protein-polysaccharide complex.

13. The method of claim 12 wherein the metal oxide filler is iron oxide.

14. The method of claim 1 wherein the protein-polysaccharide composition further comprises up to 20% by weight of borax.

15. The method of claim 1 wherein the protein-polysaccharide composition further comprises up to 10% by weight an adjuvant selected from the group consisting of expanded corn gluten, urea and tall oil.

16. An asphalt or bitumen containing composition having improved resistance to erosion and enhanced internal adhesion comprising a protein-polysaccharide complex composition comprising:

between about 90% to 99.5% by weight of a water-soluble polysaccharide impregnated with between about 10% to 0.5% by weight of a substantially water-insoluble protein.

17. The asphalt or bitumen composition of claim 16 wherein the water-soluble polysaccharide is selected from the group consisting of alginate, carrageenin, gum arabic, tragacanth, guar gum, pectin, ghatti, xanthan gum and mixtures thereof.

18. The asphalt or bitumen composition of claim 16 wherein the substantially water-insoluble protein is a prolamine.

19. The asphalt or bitumen composition of claim 16 wherein the substantially water-insoluble protein is zein.

20. The asphalt or bitumen composition of claim 16 wherein the protein-polysaccharide complex composition further includes at least one additive for promoting impregnation of the water-soluble polysaccharide by the protein.

21. The asphalt or bitumen composition of claim 16 wherein the substantially water-insoluble protein is hordein or giladin.

22. The asphalt or bitumen composition of claim 16 wherein the effective amount of the protein-polysaccharide complex composition to enhance the internal adhesion of asphalt or bitumen containing compositions is from 0.0001 to 3.0 weight percent of the total asphalt or bitumen containing composition.

23. The asphalt or bitumen composition of claim 16 wherein the water-soluble polysaccharide comprises guar gum and the substantially water-insoluble protein comprises zein.

24. The asphalt or bitumen composition of claim 16 wherein the protein-polysaccharide complex composition further comprises between about 0.25% to 5% by weight of an acidulant.

25. The asphalt or bitumen composition of claim 24 wherein the acidulant is selected from the group consisting of tannic acid, lactic acid, ascorbic acid, acetic acid, citric acid, malic acid, adipic acid, fumaric acid and mixtures thereof.

26. The asphalt or bitumen composition of claim 24 wherein the acidulant is citric acid.

27. The asphalt or bitumen composition of claim 16 wherein the protein-polysaccharide composition further comprises 0.125 to 5% by weight of a metal oxide filler calculated on the weight of the protein-polysaccharide complex.

28. The asphalt or bitumen composition of claim 27 wherein the metal oxide filler is iron oxide.

29. The asphalt or bitumen composition of claim 16 wherein the protein-polysaccharide composition further comprises up to 20% by weight of borax.

30. The asphalt or bitumen composition of claim 16 wherein the protein-polysaccharide composition further comprises up to 10% by weight an adjuvant selected from the group consisting of expanded corn gluten, urea and tall oil.

31. The asphalt or bitumen composition of claim 16 wherein the protein-polysaccharide composition further comprises 1 to 5% by weight of rock fines or dust.

32. The asphalt or bitumen composition of claim 16 further comprising between 4.3 to 4.7 by weight of asphalt emulsion or bitumen.

33. A method of enhancing internal adhesion of a cementitious composition by admixing with said cementitious composition an effective amount to enhance the internal adhesion of cementitious compositions of a protein-polysaccharide complex composition comprising:

between about 90% to 99.5% by weight of a water-soluble polysaccharide impregnated with between about 10% to 0.5% by weight of a substantially water-insoluble protein.

34. The method of claim 33 wherein the water-soluble polysaccharide is selected from the group consisting of alginate, carrageenin, gum Arabic, tragacanth, guar gum, pectin, ghatti, xanthan gum and mixtures thereof.

35. The method of claim 33 wherein the substantially water-insoluble protein is a prolamine.

36. The method of claim 33 wherein the substantially water-insoluble protein is zein.

37. The method of claim 33 wherein the protein-polysaccharide complex composition further includes at least one additive for promoting impregnation of the water-soluble polysaccharide by the protein.

38. The method of claim 33 wherein the substantially water-insoluble protein is hordein or gliadin.

39. The method of claim 33 wherein the effective amount of the protein-polysaccharide complex composition to enhance the internal adhesion of said cementitious composition is from 0.0001 to 3.0 weight percent of the total cementitious composition.

40. The method of claim 33 wherein the water-soluble polysaccharide comprises guar gum and the substantially water-insoluble protein comprises zein.

41. The method of claim 33 wherein the protein-polysaccharide complex composition further comprises between about 0.25% to 5% by weight of an acidulant.

42. The method of claim 41 wherein the acidulant is selected from the group consisting of tannic acid, lactic acid, ascorbic acid, acetic acid, citric acid, malic acid, adipic acid, fumaric acid and mixtures thereof.

43. The method of claim 42 wherein the acidulant is citric acid.

44. The method of claim 33 wherein the protein-polysaccharide composition further comprises 0.125 to 5% by weight of a metal oxide filler calculated on the weight of protein-polysaccharide complex.

45. The method of claim 44 wherein the metal oxide filler is iron oxide.

46. The method of claim 33 wherein the protein-polysaccharide composition further comprises up to 20% by weight of borax.

47. The method of claim 33 wherein the protein-polysaccharide composition further comprises up to 10% by weight an adjuvant selected from the group consisting of expanded corn gluten, urea and tall oil.

48. A cementitious composition having improved resistance to erosion and enhanced internal adhesion comprising a protein-polysaccharide complex composition comprising:

between about 90% to 99.5% by weight of a water-soluble polysaccharide impregnated with between about 10% to 0.5% by weight of a substantially water-insoluble protein.

* * * * *